May 22, 1928.  1,670,621
J. HENNEVELD
GUN SUPPORT
Filed Dec. 31, 1926   2 Sheets-Sheet 1

INVENTOR
JACOBUS HENNEVELD
BY
ATTORNEY

May 22, 1928.

J. HENNEVELD

GUN SUPPORT

Filed Dec. 31, 1926

1,670,621

2 Sheets-Sheet 2

INVENTOR
JACOBUS HENNEVELD
BY

ATTORNEY

Patented May 22, 1928.

1,670,621

UNITED STATES PATENT OFFICE.

JACOBUS HENNEVELD, OF ZAANDAM, NETHERLANDS.

GUN SUPPORT.

Application filed December 31, 1926, Serial No. 158,221, and in the Netherlands February 24, 1926.

The object of this invention is to provide a combination and arrangement of parts appertaining to a gun mounting whereby an extremely firm and steady mounting of the gun and its supported parts is obtained; the efficiency of the gun mounting being enhanced by the inclusion in the combination of parts of mechanism, of devices hereinbefore used in connection with gun mountings such, for instance, as a spirit level to ensure the training-pivot being vertical and scales and pointers to indicate the degree of elevation and horizontal movement of the gun.

The invention, hereinafter described, relates to gun mountings of that particular type in which a base for the cradle of the gun is caused to slide, as a whole, over an arcuate upstanding guide, by suitable means, in a direction which is parallel to the gun. In such constructions it has been proposed to mount a gun so as to turn about a training-pivot projecting from the aforesaid movable base; the socket which encompasses the pivot having a rearwardly extending arm of which the outer end is movable and adjustable along an arcuate guide horizontally disposed on the aforesaid cradle base.

According to this invention, a gun support of the type hereinbefore referred to, has one end of the arcuate guide revoluble about the training-pivot, which is, in this instance, on the tripod itself instead of on the movable cradle-base, whilst the other end of the arcuate guide is adapted to move along a horizontally disposed arcuate support which is on the rigid central portion of the tripod, instead of being on the movable cradle base. The pin of the pivot can be on the tripod and the socket on the arcuate guide or vice-versa. The pivot is set vertical by adjusting the tripod legs with the aid of levels, and certain of the movable parts have scales and pointers to indicate their precise positions. The cradle is fitted with means for accurately adjusting the elevation, said means comprising, for instance, a threaded sleeve in which is a screw-threaded spindle and a hand-wheel having a graduation. As these means only serve to adjust the elevation between two division marks of the graduation on the slide of the cradle base, the said threaded sleeve and screw spindle may be so short that no appreciable error is caused by the fact that the chord is taken for the arc.

Reference being had to the drawings herewith:—

Figure 1:
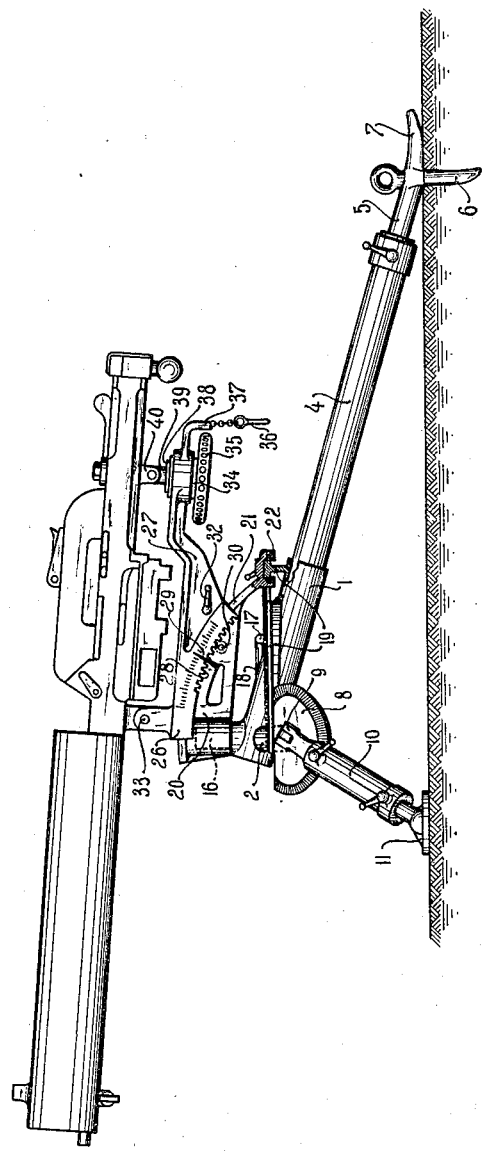
Figure 2:
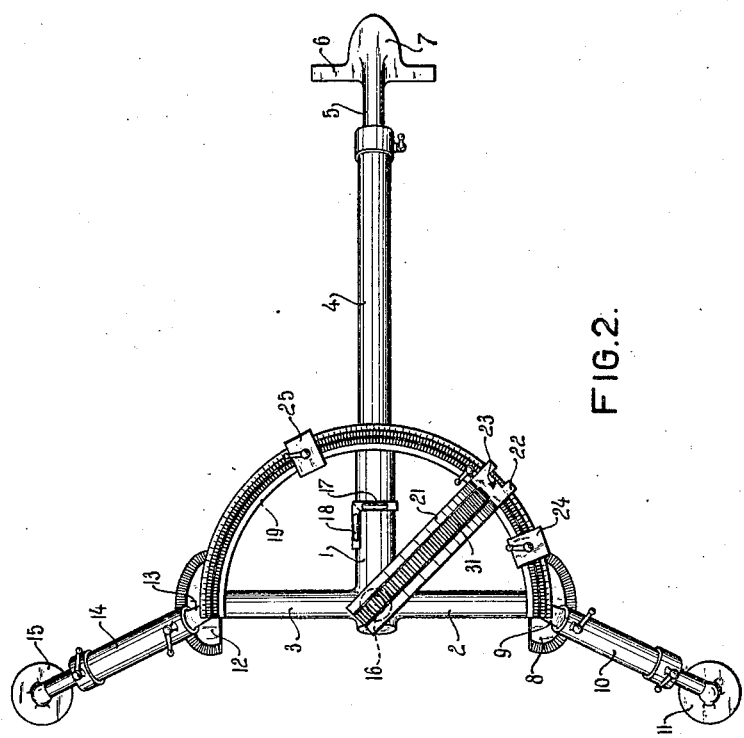

Figure 1 of the drawing illustrates, by way of example only, a support in accordance with the invention, with a machine gun mounted thereon, Figure 2 being a plan view of the support with the cradle removed, so as to clearly show the supporting member and the segment.

The tripod of the support has a rigid central portion or spider, composed of three short lengths of tubes 1, 2 and 3. The tube 1 has a rearward extension or leg 4, which has a telescopic connection with a rod 5 provided with a spur 6 and a ground plate 7. Each of the tubes 2 and 3 is provided with a toothed sector 8 and 12, respectively and with a hinge 9 and 13, respectively, for securing in position the lateral telescopic legs 10 and 14 provided with ball jointed ground plates 11 and 15, respectively.

The rigid spider of the tripod has a centrally disposed pin 16 of a training-pivot, which, by adjustment of the legs, can be set exactly vertical with the aid of levels 17 and 18, and, further with a semi-circular segment 19. The pin 16 of the training pivot fits within a socket of the cradle-base 26, but it will be understood that the pin 16 can be on the arcuate guide 20 and the socket on the head of the tripod. The arcuate guide 20 has a curved raceway 21 for the base 26 for the cradle of the gun which base is provided, at its rear end, with a slide piece 22. This slide piece is adapted to move over the segment 19 and has an index 23 for indicating its exact position. On either side of the slide piece 22, the segment 19 has an adjustable abutment 24, 25, which serves to prevent the line of fire from being moved beyond a predetermined direction, for instance, with a view to protecting troops in the forefield. The segment 19 has a toothed rim by means of which the abutments 24 and 25 may be secured against displacement.

The slide piece 22 is also adapted to be clamped to the segment 19 and may be fitted with means for accurately adjusting the supporting member between two adjacent teeth of the segment and for attaining a certain horizontal spread when firing.

The grooved slide of the cradle-base 26 is movable over the raceway 21 of the arcuate guide 20. Said slide has a scale co-operating with a pointer 29, and a toothed rim 28 co-operating with a pinion 30 rotatably mounted in the arcuate guide 20 of the supporting member. Consequently the cradle-base with the gun cradle and gun may be set at the required elevation by means of the pinion 30 the shaft of which, for this purpose, is provided with a crank (not shown). A toothed rim 31 (Figure 2) and a clamping piece, operable through a handle 32, serve to secure the base for the cradle in position.

In order that the elevation of the gun may be accurately adjusted between two adjacent teeth of the rim 28, the cradle-base is pivoted as at 33 to the gun and fitted near its rear end with a threaded sleeve 34 having a hand wheel 35 secured thereto. Said handwheel is provided with a graduation, the division marks of which correspond with holes in the rim of the wheel. Tappets 36, adapted to be inserted into these holes and to co-operate with an abutment 37, serve to limit the angular distance, through which the handwheel can be turned. The threaded sleeve 34 works in a nut of the cradle-base and, itself, acts as a nut for a hollow screw spindle 38, which is pivotally connected with the rear end 40 of the machine gun through a short rod 39 hinged thereto.

The gun is pointed at a visible or invisible object, independently of the sight, in the following manner:

First of all, the training-pivot 16 is set exactly vertical with the aid of the water-levels 17, 18 and by suitable adjustment of the legs of the tripod. The required elevation is read from a table in accordance with the known or the gauged distance from the target, allowances being made for the type of cartridge used, whereupon the gun is set under this elevation with the aid of the pinion 30 and the handwheeel 35. If the target is not visible, the gun is pointed at a visible object in the forefield, for instance a church-steeple and the angular distance between the lines connecting the range with said visible point and with the invisible target, respectively, determined, whereupon the supporting member 20, together with the cradle-base and the gun, is turned about the training-pivot 16 through said angular distance with the aid of the division on segment 19. Finally the supporting member 20 is clamped to the segment 19, the cradle 27 clamped to the supporting member 20 and the handwheel 35 immobilized with respect to the cradle-base 26.

What I claim is:—

1. A machine gun support comprising a spider member, an arcuate guide member, means for permitting the arcuate guide member, to be revolved consisting of a pivot pin mounted on one of said members and a socket for the pin mounted on the other of said members, a telescopic leg secured to each arm of the spider member, a horizontally-disposed arcuate segment rigidly supported by each arm of the spider member, one end of said arcuate guide member being adapted to slide along said arcuate segment when the guide member is revolved, a level on said spider member to permit the vertical setting of said pivot pin by adjustment of said telescopic legs, a cradle member adapted to support the gun and mounted on said arcuate guide member, a scale on one of the two last-mentioned members, and an index on the other of the two last-mentioned members for indicating the elevation of the gun.

2. The gun support recited in claim 1 together with additional means on the cradle member for accurately adjusting the elevation of the gun, means for limiting the amount of this additional adjustment, and a scale and index for indicating the amount of such additional adjustment.

In testimony whereof I affix my signature.

JACOBUS HENNEVELD.